Nov. 17, 1970    J. H. MULLEN    3,541,434
APPARATUS FOR THE BROADBAND MICROWAVE DETERMINATION
OF CERTAIN CHARACTERISTICS OF SUBSTANCES
Filed Aug. 25, 1966
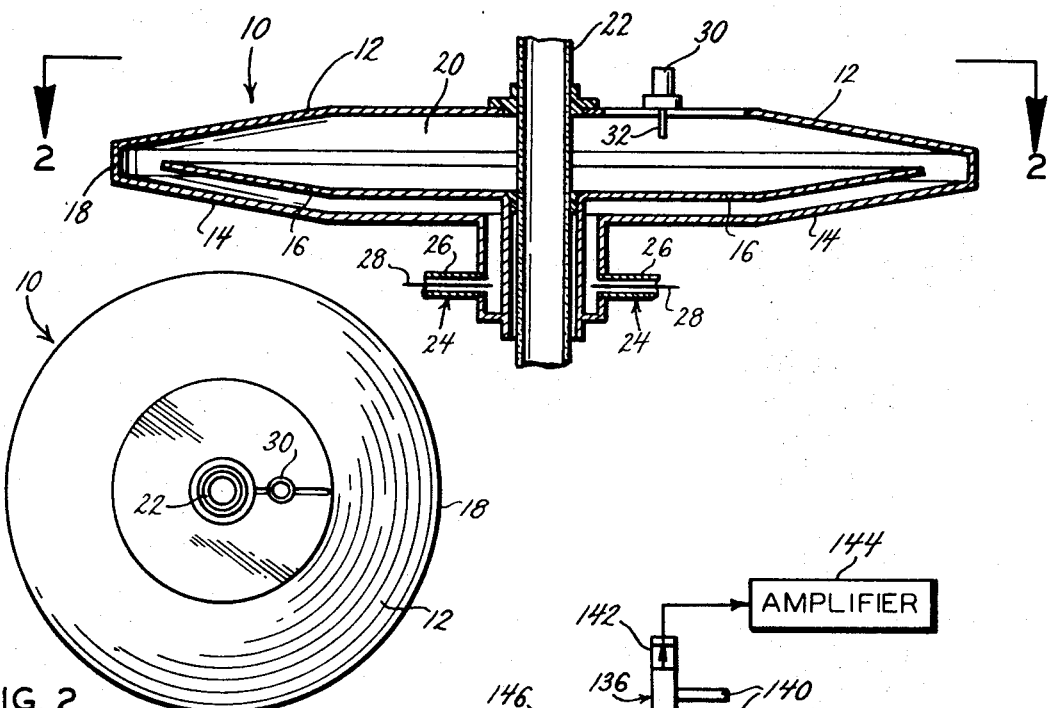
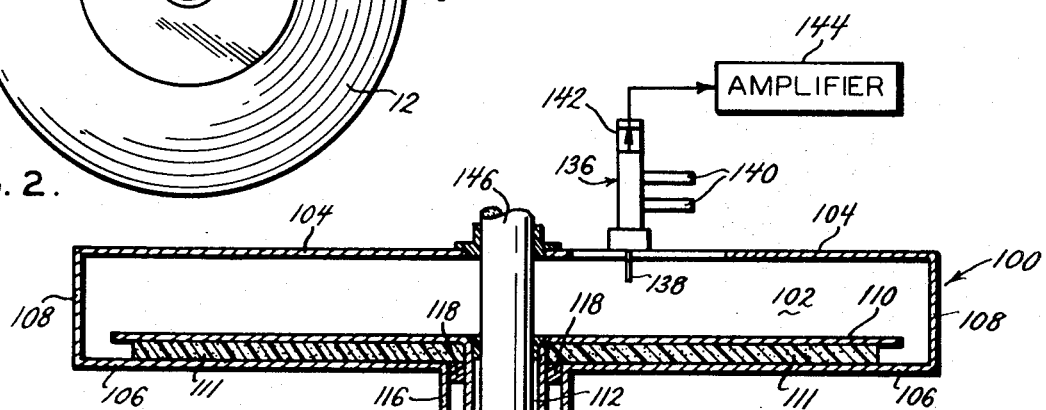
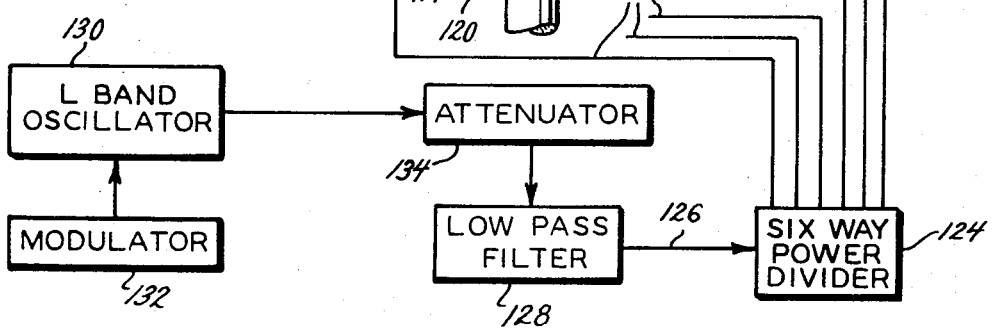
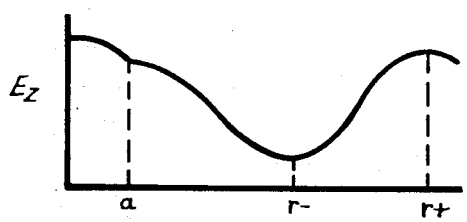
INVENTOR.
JOHN H. MULLEN
BY
Charles B. Haverstock
ATTORNEY

United States Patent Office 3,541,434
Patented Nov. 17, 1970

1

3,541,434
APPARATUS FOR THE BROADBAND MICROWAVE DETERMINATION OF CERTAIN CHARACTERISTICS OF SUBSTANCES
John H. Mullen, Creve Coeur, Mo., assignor, by mesne assignments, to McDonnell Douglas Corporation, St. Louis, Mo., a corporation of Maryland
Filed Aug. 25, 1966, Ser. No. 575,089
Int. Cl. G01r 27/04
U.S. Cl. 324—58                     8 Claims

ABSTRACT OF THE DISCLOSURE

An apparatus for the broadband microwave determination of certain characteristics of objects and substances including a radial transmission line structure having symmetrical characteristics, the object or substance being positioned on the axis of said structure, and means for introducing microwave energy symmetrically into said structure to establish a symmetrical standing wave therein, certain chaarcteristics of said symmetrical standing wave depending upon the characteristics of the object or substance on the axis thereof.

---

The present invention relates generally to means and methods for determining the characteristics of dielectric substances, and more particularly to means and methods for measuring the complex dielectric constants and other characteristics of such substances.

Various mean have been devised for measuring properties and characteristics of dielectric substances including dielectric solids, liquids and gaseous substance or plasmas. For the most part, the known means require some physical change or disturbance of the dielectric substance under test as, for example, attaching or inserting a test device or probe therein. Such changes or disturbances are undesirable and may effect the accuracy and reliability of the information obtained. Available test means using microwave energy also produces undesirable microwave scattering and refraction which further adversely effects the data obtained. The present invention teaches the construction and operation of improved means for measuring the characteristics of dielectric substances, which means overcome these and other disadvantages and shortcomings of known and available devices and provide more accurate and reliable results. The present device also provides means for obtaining more information about dielectric substances including information as to the complex dielectric constants, the electron density, the collision frequency and other characteristics of dielectric substances. The improved results obtained by the present device in large part are due to the use of a radial transmission line structure having symmetrical characteristics, which construction minimizes undesirable radiation and refraction and overcomes non-uniformities which are present in known wave guides and in the dielectric substances under test. The use of a radial transmission line structure also permits use of a cylindrical coordinate system which has certain advantages over other systems.

It is therefore a principal object of the present invention to provide improved means and method for obtaining data from which the characteristics of dielectric substances including the complex dielectric constants thereof can be accurately determined.

Another object is to provide means for obtaining data about dielectric substances from which it is possible to accurately determine certain characteristics of the substances including its electron density, collision frequency, standing wave ratio and so forth.

2

Another object is to provide means by which certain characteristics of dielectric substances can be accurately controlled and changed.

Another object is to provide a test device including a radial transmission line having improved operating characteristics.

Another object is to reduce or eliminate undesirable radiation, microwave scattering, and refraction in test devices using microwave energy.

Another object is to provide accurate means for measuring the effects of chemical and other forms of seeding on certain characteristics of dielectric substances including the electron density, collision frequency, standing wave ratio and other characteristics.

Another object is to provide means for accurately determining the ability of dielectric substances such as dielectric plasmas to pass radio and other forms of electromagnetic energy.

Another object is to provide a test device useful for overcoming communications blackouts due to the relatively high electron densities and collision frequencies of dielectric plasmas encountered by space vehicles during reentry into the earth's atmosphere.

These and other objects and advantages of the present invention will become apparent after considering the following detailed specification which covers a preferred embodiment thereof in conjunction with the accompanying drawing, wherein:

FIG. 1 is a cross-sectional view through the center of a radial transmission line constructed as a test device for obtaining data about dielectric substances;

FIG. 2 is a cross-sectional view taken on line 2—2 of FIG. 1;

FIG. 3 is a cross-sectional view through the center of a modified form of the subject test device, said drawing including in block form the circuit connections thereto; and, FIG. 4 is a graph showing the electric field strength of a standing wave produced by the present device as a function of radius.

Referring to the drawing more particularly by reference numbers, number 10 is a radial transmission line structure used for gathering data as to the characteristics of dielectric substances and is constructed according to the present invention. The transmission line 10 includes a housing structure formed by spaced and axially aligned disc members 12 and 14, which members are round and also shaped so that their outer peripheries are closer together than their center portions. A round divider disc 16 of a somewhat smaller diameter than the discs 12 and 14 is positioned at an intermediate location inside the housing between the discs 12 and 14 such that the space in the housing on both sides of the disc 16 communicates around the periphery thereof. The outer edges of the discs 12 and 14 are also connected by an annular wall 18 so that the members 12, 14 and 18 define a closed chamber 20.

A thin wall tube 22 of a dielectric substance such as quartz or glass extends axially through the transmission line structure 10, and a dieletcric substance to be measured or tested is positioned inside the tube 22. The dielectric substances can be a solid, a liquid or a gaseous substance, and the tube 22 can be substituted for by a solid or partially solid dielectric rod.

A plurality of coaxial connectors or cables such as the connectors 24 are attached to the structure 10 at spaced locations around the tube or rod 22 as shown. Any number of connectors 24 can be provided and it is preferred to have a sufficient number so that microwave energy, which is introduced into the chamber 20 through the connectors 24, is relatively evenly and uniformly distributed around the structure 10. It has been found that six or more such connections provides satisfactory microwave energy distribution in most cases. Each of the coaxial connectors 24 includes a tubular outer conductor 26 which is connected electrically to the structure 10 including the discs 12 and 14, and a center conductor 28 insulated from the outer conductor 26 by air or some other suitable dielectric material. The center conductors 28 are open ended at the structure 10 and communicate with the space between the discs 14 and 16.

Energy from one or more microwave sources is fed to the device through the plurality of connectors 24, and this energy radiates outwardly circumferentially and symmetrically in the space between the discs 14 and 16. In so doing the energy forms a relatively uniformly distributed standing wave in the chamber 20. The characteristics of the standing wave produced depend on the particular dielectric material in the tube 22. The standing wave is also propagated in a particular transverse electromagnetic (TEM) mode and extends outwardly from the dielectric material between the discs 14 and 16. As already mentioned, the characteristics of the dielectric material effect the characteristics of the standing wave including the locations where the maximum and minimum wave field strengths occur and the magnitudes of the wave strengths at these locations. This information also effects the standing wave ratio. From this information, it is also possible to determine other facts about the dielectric substance including its complex dielectric constants, its electron density and its collision frequency.

The locations and magnitudes of the minimum and maximum wave strengths are determined by means of a movable carriage assembly 30 which includes a test probe 32. The assembly 30 is radially movable on the surface of the disc 12 and the probe 32 is connected by suitable means to a device which indicates the field strength of the standing wave. When the maximum and minimum wave strength locations are determined the distance between these locations can be measured, and with the information thus far obtained it is possible to accurately calculate the real and imaginary dielectric constants of the dielectric substance being tested.

Heretofore, when gathering data about dielectric substances such as ionized gases or plasmas, the substance was confined to a particular geometry or shape and it was not convenient to use a test probe because the probe would disturb the plasma and would require an opening into the plasma container. This greatly limited the usefulness and reliability of the data obtained by known test devices particularly when used to gather data about gaseous substances, and it also effected the accuracy of the information obtained because of the disturbing influences introduced into the dielectric substances by the test means themselves. The present device overcomes these and other limitations of the known devices and provides means by which the characteristics of dielectric substances including dielectric plasmas can be accurately determined without disturbing or altering the substance by the test means.

The data obtained using the subject means also makes it possible to determine information about the standing wave that is produced as well as about the test substance including information such as the standing wave ratio, the electron density, the collision frequency and so on. The electron densities and collision frequencies of certain dielectric substances and particularly dielectric gases or plasmas effect their ability to pass radio and other electromagnetic signals and the present device provides means for determining these characteristics and for modifying the dielectric substance to improve it for certain purposes. For example, it is known that during reentry of space vehicles into the earth's atmosphere charged dielectric environments are encountered which have relatively high electron densities and collision frequencies that adversely effect the ability of the vehicle to maintain radio communication. The electron density of the environment is a measure of the number of free electrons that exist per unit volume of plasma, and the collision frequency is a measure of the number of collisions that an electron incurs with the neutral particles and ions in the plasma. These conditions of a plasma can be altered or changed to improve the ability of the plasma to pass electromagnetic energy by various means such as by chemically seeding the plasma and so forth. The improvements thus effected can be measured under actual or test conditions using the subject device. It is therefore possible with the subject device to accurately determine what materials or chemicals are most effective for this purpose and also the amounts that are required.

The improved performance of the present device is due in large measure to the symmetrical construction of the radial transmission line structure 10 which substantially reduces or eliminates microwave scattering and refraction and improves the wave form and distribution. The present device is also superior to known constructions which employ rectangular wave guides having dielectric posts positioned in them because such devices lose radiation through their openings and they also produce non-uniform wave distribution characteristics relative to the dielectric substance being tested. This is particularly true in the radial directions. The same is not true of the present device, however, because in the present device the dielectric substance being tested regardless of its physical state is located on the axis of a symmetrical structure and the microwave energy is introduced uniformly at spaced locations. Furthermore, having the dielectric substances being tested located on the axis of the transmission line greatly simplifies the calculations that must be made because it enables use of a cylindrical coordinate system FIG. 3 shows a modified embodiment 100 of the subject device which is constructed to include a substantially cylindrical chamber 102 instead of a tapered chamber such as is employed in the structure 10 of FIG. 1. The modified structure 100 includes a pair of spaced circular housing walls or discs 104 and 106 which are connected together at their outer peripheries by a cylindrical wall portion 108. A divider wall 110 of a somewhat smaller diameter than the walls 104 and 106 is positioned in the chamber 102 between the walls 104 and 106 as shown. In the modified construction an optional layer of styrofoam or similar dielectric material 111 is positioned between the divider wall 110 and the wall 106 for cushioning and support.

The divider wall 110 has a central opening 112 and its inner edge is connected to one end of a tubular wall member 114 which extends axially from the wall 110 through a larger diameter central opening formed in the wall 106. A second tubular member 116 is concentric with the wall 114 and has one of its ends connected to an inner peripheral edge which defines an opening in the wall member 106. An annular collar 118 of a dielectric material is positioned between the tubular members 114 and 116 to maintain them in spaced relationship. The opposite ends of the tubular members 114 and 116 are connected by an annular wall portion 120.

A plurality of openings are formed in the tube 116 at spaced locations thereabout for attaching a corresponding number of coaxial connectors 122. Provision for six such connectors is shown in the drawing. The opposite ends of the coaxial connectors 122 are connected to respective outputs of a six-way power divider structure 124 which is fed energy through another connector 126 which has its other end connected to the output of a low pass filter circuit 128. The filter circuit 128 is in turn fed by the output of an L band oscillator circuit 130 which is modulated by modulator circuit 132. The output of the oscillator 130 is fed to the filter circuit 128 through attenuator means 134.

A movable assembly 136 is mounted on the housing 104. The assembly 136 includes a test probe 138 which extends into the chamber 102 and responds to the characteristics of standing waves generated therein. In the particular embodiment disclosed in FIG. 3, the assembly 136 includes turning means shown as double stub tuner 140, a crystal detector 142, and an amplifier circuit 144. The output of the amplifier circuit is connected to suitable indicator means, not shown.

Microwave energy is fed to the modified transmission line structure 100 through the coaxial connectors 122. This energy forms an incident traveling wave which extends through the space between the tubes 114 and 116 and then radiates outwardly in a substantially uniform distribution through the styrofoam material 111. The energy wave is then reflected around the outer edge of the divider wall 110 and back toward the dielectric material 146 by the cylindrical outer wall 108. The reflection from the dielectric material causes a standing wave which is determined entirely by the particular dielectric material being tested. The locations and magnitudes of the maximum and minimum points on the standing wave are located by moving the assembly 136 on the wall 104 while observing the outputs of the amplifier circuit 144, which circuit feeds suitable indicator means. The structure and operation of the modified device 100 is similar to the structure and operation of the device disclosed in FIG. 1 and can be used for substantially the same purposes.

Electromagnetic energy from the transverse electromagnetic (TEM) mode converging on the dielectric material in the center of the subject radial transmission line or wave guide 100 results in a reflected wave from the dielectric air interface and thus an electric field standing wave pattern such as shown in FIG. 4 where $E_z$, which is the electric field, is plotted as a function of $r$ which is the radius measured from the axis of the device. The electric and magnetic fields can be expressed by the equations:

$$E_z = H_0^{(1)}(Kr) + \Gamma H_0^{(2)}(Kr)$$

$$H_\phi = \frac{j}{\eta_0}(H_1^{(1)}(Kr) + \Gamma H_1^{(2)}(Kr))$$

In these equations $H_0^{(1,2)}(Kr)$ are Hankel functions of zero and first order and of the first and second kind, respectively and $\eta_0$ is the characteristic wave impedance of free space, and K is the propagation constant. The above equations can be further expressed by the equations:

$$E_z = G_0(Kr)(e^{+j\theta(Kr)} + \Gamma e^{-j\theta(Kr)})$$

$$H_\phi = -\frac{G_1(Kr)}{\eta_0}(e^{+j\gamma(Kr)} - \Gamma e^{-j\gamma(Kr)})$$

Where $\Gamma$ is the complex reflection coefficient.

From the above equations it is possible to derive the voltage standing wave ratio (VSWR) which is an expression of the ratio of the relative wave strengths at the maximum ($Kr_+$) and minimum ($Kr_-$) points. This can be expressed by the equation:

$$VSWR\left|\frac{E_{max.}}{E_{min.}}\right| = \left|\frac{G_0(Kr_+)(e^{+j\theta(Kr_+)} + \Gamma_0 e^{j(\alpha(Kr_+)-\theta(Kr_+))})}{G_0(Kr_-)(e^{+j\theta(Kr_-)} + \Gamma_0 e^{j(\alpha(Kr_-)-\theta(Kr_-))})}\right|$$

In like manner, when using known mathematical formulas the wave impedance can be expressed by the equation:

$$Z_- = \frac{E_z}{H_\phi}\bigg|_{r=r_-} = -\eta_0 \frac{G_0(Kr_-)}{G_1(Kr_-)} \frac{e^{+j\theta(Kr_-)} + \Gamma e^{j\theta(Kr_-)}}{e^{+j\gamma(Kr_-)} - \Gamma e^{j\gamma(Kr_-)}}$$

The normalized components of the magnitude and angle of the wave impedance can also be calculated from the above information. For example, the real and imaginary parts of the relative permitivity follow from the fact that $$(X_r - jX_i)^2 = (K_0 a)^2 (K_r - jK_i)$$

so that $$K_r = \frac{X_r^2 - X_i^2}{(K_0 a)^2}$$

and $$K_i = \frac{2X_r X_i}{(K_0 a)^2}$$

From this information the electron density and collision frequency of the dielectric substance can be determined by solving the following equations using the values of the real and imaginary dielectric constants as determined above.

The electron density is expressed by the equation:

$$Ne = \frac{\epsilon_0 m_e \omega^2}{e}\left(\frac{K_i^2}{1-K_r} + 1 - K_r\right)$$

Where $\epsilon_0$ = permitivity of free space
$M_e$ = mass of electron
$\omega$ = angular signal frequency, and
$e$ = electronic charge.

The collision frequency is expressed by the equation:

$$V = \frac{K_i \omega}{1-K}$$

Using standardized charts of Bessel and other functions the above and other information can be determined easily and quickly for each set of test data obtained. It is therefore possible using the subject device to determine many important characteristics of dielectric substances. For example, the present device can be used to obtain data from which to determine the characteristics of dielectric plasmas under different conditions such as under different chemically seeded conditions. This can be done in order to change the characteristics of the plasma for some purposes such as to enable the plasma to better support radio communication.

The present device has many applications and purposes in addition to those mentioned including simply being used to test and obtain data about various dielectric substances and combinations thereof with other dielectric and non-dielectric substances. The chemical seeding of plasmas which is referred to above can be used to modify several different characteristics of the dielectric substances and these changes can be relatively accurately measured using the subject means. For example, chemical seeding can reduce the electron density and/or the collision frequency of a dielectric plasma so that the plasma will better support radio communication and prevent communication blackouts during the reentry of space vehicles into the earth's atmosphere. Many other applications and uses including providing accurate means for testing all kinds of dielectric substances under various conditions are also possible and within the scope of the present invention. It will also be apparent that the particular embodiments selected to illustrate the invention are for illustrative purposes only and many other forms of the device are possible. Furthermore, the spacing and size of the members can be greatly varied depending upon the material to be tested. The number of coaxial connectors feeding microwave energy into the device can be varied depending upon the uniformity, distribution and concentration of energy desired, and various means can be used for mounting and moving the carriage assembly. It is preferred, however, that the subject device include a radial transmission line having a symmetrical construction for the best operating conditions.

Thus there has been shown and described novel means and methods for determining the properties and characteristics of dielectric materials of all kinds, which means and methods fulfill all of the objects and advantages sought therefor. Many changes, modifications, alterations, variations and other uses and applications of the subject means will, however, become apparent to those skilled in the art after considering this specification and the accompanying drawing. All such changes, modifications, alterations, variations and other uses and applications which do not depart from the spirit and scope of the invention are deemed to be covered by the invention which is limited only by the claims which follow.

What is claimed is:

1. Means for obtaining data about dielectric substances comprising a waveguide of symmetrical construction having an axis through the center thereof, means locating a dielectric substance on the axis of said waveguide, means for introducing microwave energy within a relatively broad range of frequencies into the waveguide symmetrically relative to the axis thereof, means deflecting the microwave energy radially outwardly from the axis, means for further deflecting the microwave energy back toward the dielectric substance whereby a standing wave is produced in the waveguide the characteristics of which are determined by the characteristics of the dielectric substance, and means sensitive to the energy of the standing wave including test probe means movable relative to the waveguide for determining the magnitude of the standing wave at various locations in the waveguide.

2. Means for obtaining data about a dielectric substance comprising a radial transmission line having symmetrical characteristics including a housing defined by spaced substantially circular walls, means connecting the outer peripheries of said walls, a divider wall of less diameter than the housing walls positioned at an intermediate location between said housing walls, means for maintaining the dielectric substance extending through the housing on the axis thereof, means for introducing microwave energy into the housing in the space between one of said housing walls and the divider wall, said energy producing a standing wave in the housing which extends outwardly between said one housing wall and the divider wall and back around the outer edge of the divider wall toward the dielectric substance in the space between the divider wall and the other housing wall, and energy sensitive means movable relative to one of said spaced housing walls, said energy sensitive means including means responsive to the strength of the standing wave at selected positions in the housing.

3. The means for obtaining data about a dielectric substance defined in claim 2 wherein said dielectric substance includes a tubular member of a first dielectric material and a substance of another dielectric material positioned in said tubular member.

4. The means for obtaining data about dielectric substances defined in claim 2 including a source of microwave energy, and means for introducing microwave energy from said source into the housing at spaced locations around the axis thereof.

5. The means for obtaining data about dielectric substances defined in claim 4 wherein said means for introducing microwave energy includes a plurality of coaxial connection means connected to the housing at spaced locations around the axis thereof.

6. The means for obtaining data about dielectric substances defined in claim 2 including a layer of dielectric material positioned between the divider wall and one of said circular housing walls.

7. A radial transmission line comprising a housing including a pair of spaced circular wall members, means connecting the peripheries of said wall members to define a substantially closed chamber therebetween, means mounting a dielectric substance on the axis of said housing structure, a divider wall mounted in the housing at a location spaced between the circular housing walls, said divider wall having a diameter less than the diameter of a housing wall so that the spaces in the housing on opposite sides of the divider wall communicate around the periphery thereof, means for introducing microwave energy into the housing through one of the housing walls between said one housing wall and the divider wall, said microwave energy establishing a standing wave inside the housing which extends outwardly between the divider wall and said one housing wall and around the outer periphery of the divider wall back toward the dielectric substance in the space between the divider wall and the other housing wall, at least some of the characteristics of said standing wave depending on the particular dielectric substance positioned on the axis of the structure, means sensitive to the strength of the standing wave including a test probe mounted for movement on one of said housing walls, and means responsive to the strength of the wave sensed by the test probe for producing an indication thereof.

8. The radial transmission line defined in claim 7 wherein said means for introducing microwave energy into the housing includes a source of microwave energy and a plurality of connections between said source and said one housing wall at spaced locations around the axis of said housing for uniformly and symmetrically introducing and distributing said microwave energy in the housing.

References Cited

UNITED STATES PATENTS 2,491,418    12/1949    Schlesman.
2,548,598    4/1951    Feiker.

EDWARD E. KUBASIEWICZ, Primary Examiner

UNITED STATES PATENT OFFICE
CERTIFICATE OF CORRECTION

Patent No. 3,541,434                  November 17,

John H. Mullen

It is certified that error appears in the above identifie patent and that said Letters Patent are hereby corrected as shown below:

Column 5, line 1, after "housing" insert -- wall --; li 5, "turning" should read -- tuning --; line 42, lower right-portion of the equation, "(Kr)" should read -- (Kr)) --; lin the lower right-hand portion of the equation reading $$\Gamma e^{j\gamma(Kr-)} \quad \text{should read} \quad \Gamma e^{-j\gamma(Kr-)}$$

Column 6, line 23, "$M_e$ = mass of electron" should read -- $\eta$ mass of electron --.

Signed and sealed this 27th day of April 1971.

(SEAL)
Attest:

EDWARD M. FLETCHER, JR.            WILLIAM E. SCHUYLI
Attesting Officer                     Commissioner of Pa